(12) United States Patent
Wijting et al.

(10) Patent No.: US 8,867,379 B2
(45) Date of Patent: Oct. 21, 2014

(54) FLEXIBLE SPECTRUM SHARING

(75) Inventors: Carl Simon Wijting, Espoo (FI); Klaus Doppler, Helsinki (FI)

(73) Assignee: Nokia Corporation, Espoo (FI)

( * ) Notice: Subject to any disclaimer, the term of this patent is extended or adjusted under 35 U.S.C. 154(b) by 896 days.

(21) Appl. No.: 12/678,215

(22) PCT Filed: Sep. 19, 2008

(86) PCT No.: PCT/IB2008/053822
§ 371 (c)(1),
(2), (4) Date: Mar. 15, 2010

(87) PCT Pub. No.: WO2009/040713
PCT Pub. Date: Apr. 2, 2009

(65) Prior Publication Data
US 2010/0202305 A1 Aug. 12, 2010

Related U.S. Application Data

(60) Provisional application No. 60/975,034, filed on Sep. 25, 2007.

(51) Int. Cl.
*H04W 4/00* (2009.01)
*H04W 16/14* (2009.01)
*H04W 16/06* (2009.01)

(52) U.S. Cl.
CPC .............. *H04W 16/14* (2013.01); *H04W 16/06* (2013.01)
USPC ............................ 370/252; 370/329; 370/437

(58) Field of Classification Search
CPC ..... H04L 1/0026; H04L 1/167; H04L 1/0027; H04L 47/14; H04L 5/0037; H04L 5/0094; H04L 12/5695; H04L 1/1867; H04L 47/24; H04L 47/2408; H04L 47/2416; H04L 47/283; H04L 47/41; H04L 47/522; H04L 47/623; H04L 47/80; H04L 47/808; H04L 47/822; H04L 47/824; H04L 47/828; H04L 12/14; H04L 12/403; H04L 12/1453; H04L 41/5003; H04L 41/5025; H04B 7/024; H04B 7/0452; H04W 52/286; H04W 72/1205; H04W 28/22; H04W 72/04; H04W 72/01; H04W 28/24; H04W 28/26; H04W 88/08; H04W 24/00; H04W 28/18; H04W 72/082; H04W 72/1231; H04W 72/1236; H04W 72/1257; H04W 74/00; H04W 80/04; G09F 9/505; G09F 9/44; G09F 9/46; G09F 9/466; G09F 9/542; H04Q 2213/13
USPC ............ 370/252, 254, 328, 329, 332, 395.42, 370/400, 401, 437
See application file for complete search history.

(56) References Cited

U.S. PATENT DOCUMENTS

| | | | |
|---|---|---|---|
| 6,985,462 B2 * | 1/2006 | Hosein | 370/329 |
| 7,949,343 B2 | 5/2011 | Kermoal | |
| 2006/0227100 A1 | 10/2006 | Kun et al. | |
| 2007/0117537 A1 * | 5/2007 | Hui et al. | 455/405 |
| 2008/0300975 A1 * | 12/2008 | Dawson et al. | 705/14 |
| 2010/0202305 A1 * | 8/2010 | Wijting et al. | 370/252 |

FOREIGN PATENT DOCUMENTS

CN 1960575 A 5/2007

OTHER PUBLICATIONS

Buddhikot, M.M.; Ryan, K., "Spectrum Management in Coordinated Dynamic Spectrum Access Based Cellular Networks", 2005 IEEE, 1-4244-0013, Sep. 2005, 9 pages.

"International Search Report", received in corresponding PCT Application No. PCT/IB2008/053822, Dated Apr. 28, 2009, 9 pages.

Akyildiz, Ian F., Lee, Won-Yeol, Vuran, Mehmet C., Mohanty, Shantidev; NeXt Generation/Dynamic Spectrum Access/Cognitive Radio Wireless Networks: A survey:; Computer Networks, vol. 50, Issue 13, May 2006, 33 pages.

Cao, Lili, Zheng, Haitao, "Distributed Spectrum Alloctaion via Local Bargaining", Sensor and Ad Hoc Communications and Networks, 2005. IEEE SECON 2005, 2005 Second Annual IEEE Communications Society Conference, pp. 475-486, Sep. 26-29, 2005, 12 pages.

Lehr, W., Crowcroft, J., "Managing Shared Access to a Spectrum Commons", New Frontiers in Dynamic Spectrum Access Networks, 2005; DySPAN 2005, 2005 First IEEE International Symposium. pp. 420-444, Nov. 8-11, 2005, 25 pages.
Office Action issued in the corresponding CN Application No. 200880107618.0, dated Aug. 29, 2012.
Office Action issued in the corresponding CN Application No. 200880107618.0, dated Apr. 27, 2013.
Chinese Office Action application No. 200880107618.0 dated Mar. 26, 2014.

* cited by examiner

*Primary Examiner* — Yemane Mesfin
*Assistant Examiner* — Mon Cheri Davenport
(74) *Attorney, Agent, or Firm* — Squire Patton Boggs (US) LLP

(57) ABSTRACT

Various example embodiments are disclosed. According to one example embodiment, a method may include receiving, by a first wireless node in a first wireless network, a request from a second wireless node in a second wireless network to borrow spectral resources from the first wireless network. The method may further include determining a cost of granting the request, the cost being based at least in part on a cost to a lending cell within the first wireless network from which the spectral resources will be borrowed and a cost to neighboring cells of the lending cell. The method may further include lending the spectral resources to the second wireless node based at least in part on the determined cost of granting the request.

20 Claims, 9 Drawing Sheets

FLEXIBLE SPECTRUM SHARING

RELATED APPLICATION

This application was originally filed as PCT Application No. PCT/IB2008/053822 filed Sep. 19, 2008, which claims priority to U.S. Provisional Application No. 60/975,034 filed 25 Sep. 2007.

TECHNICAL FIELD

This description relates to wireless networks.

BACKGROUND

Wireless networks may use spectral resources, such as different time slots, frequencies or carriers or subcarriers, or other spectral resources. More than one wireless network may be present in a geographical location. These networks may be of the same radio technology or of different radio technologies and may operate in the same frequency band. Thus, the spectrum resources can potentially be shared among these wireless networks. Different wireless networks typically use different resources to decrease interference. However, spectral resources available to a wireless network may not always be allocated to make efficient use of the resources. For example, the spectral resources allocated to each wireless network may not always correspond to the wireless network's load.

SUMMARY

According to one general aspect, a method may include receiving, by a first wireless node in a first wireless network, a request from a second wireless node in a second wireless network to borrow spectral resources from the first wireless network. The method may further include determining a cost of granting the request, the cost being based at least in part on a cost to a lending cell within the first wireless network from which the spectral resources will be borrowed and a cost to neighboring cells of the lending cell. The method may further include lending the spectral resources to the second wireless node based at least in part on the determined cost of granting the request.

According to another general aspect, the method may include receiving, by a first wireless node in a first wireless network, a request from a second wireless node in a second wireless network to borrow spectral resources from the first wireless network. The method may further include determining a cost of granting the request, the cost being based at least in part on a cost to a lending cell within the first wireless network from which the spectral resources will be borrowed and a cost to neighboring cells of the lending cell. The method may further include determining that the cost exceeds a gain from granting the request. The method may further include sending a counter-offer to lend spectral resources to the second wireless node based on the determining that the cost exceeds the gain.

According to another general aspect, the method may include receiving, by a first wireless node in a first wireless network, a request from a second wireless node in a second wireless network to borrow spectral resources from the first wireless network. The method may further include rescheduling remaining spectral resources within the first wireless network based, at least in part, on the request, the rescheduling including determining which user terminals in the first wireless network will no longer be served by the remaining spectral resources. The method may further include determining a cost associated with the rescheduling the remaining spectral resources based, at least in part, on a cost associated with each user terminal which will no longer be served by the remaining spectral resources. The method may further include sending a message to the second wireless node accepting or rejecting the request based, at least in part, on the determined cost.

According to another general aspect, an apparatus may include a controller. The apparatus may be configured to receive, by a first wireless node in a first wireless network, a request from a second wireless node in a second wireless network to borrow spectral resources from the first wireless network. The apparatus may be further configured to determine a cost of granting the request, the cost being based at least in part on a cost to a lending cell within the first wireless network from which the spectral resources will be borrowed and a cost to neighboring cells of the lending cell. The apparatus may be further configured to lend the spectral resources to the second wireless node based at least in part on the determined cost of granting the request.

According to another general aspect, an apparatus may include a controller. The apparatus may be configured to receive, by a first wireless node in a first wireless network, a request from a second wireless node in a second wireless network to borrow spectral resources from the first wireless network. The apparatus may be further configured to reschedule remaining spectral resources within the first wireless network based, at least in part, on the request, the rescheduling including determining which user terminals in the first wireless network will no longer be served by the remaining spectral resources. The apparatus may be further configured to determine a cost associated with the rescheduling the remaining spectral resources based, at least in part, on a cost associated with each user terminal which will no longer be served by the remaining spectral resources. The apparatus may be further configured to send a message to the second wireless node accepting or rejecting the request based, at least in part, on the determined cost.

The details of one or more implementations are set forth in the accompanying drawings and the description below. Other features will be apparent from the description and drawings, and from the claims.

DETAILED DESCRIPTION

Figure 1:
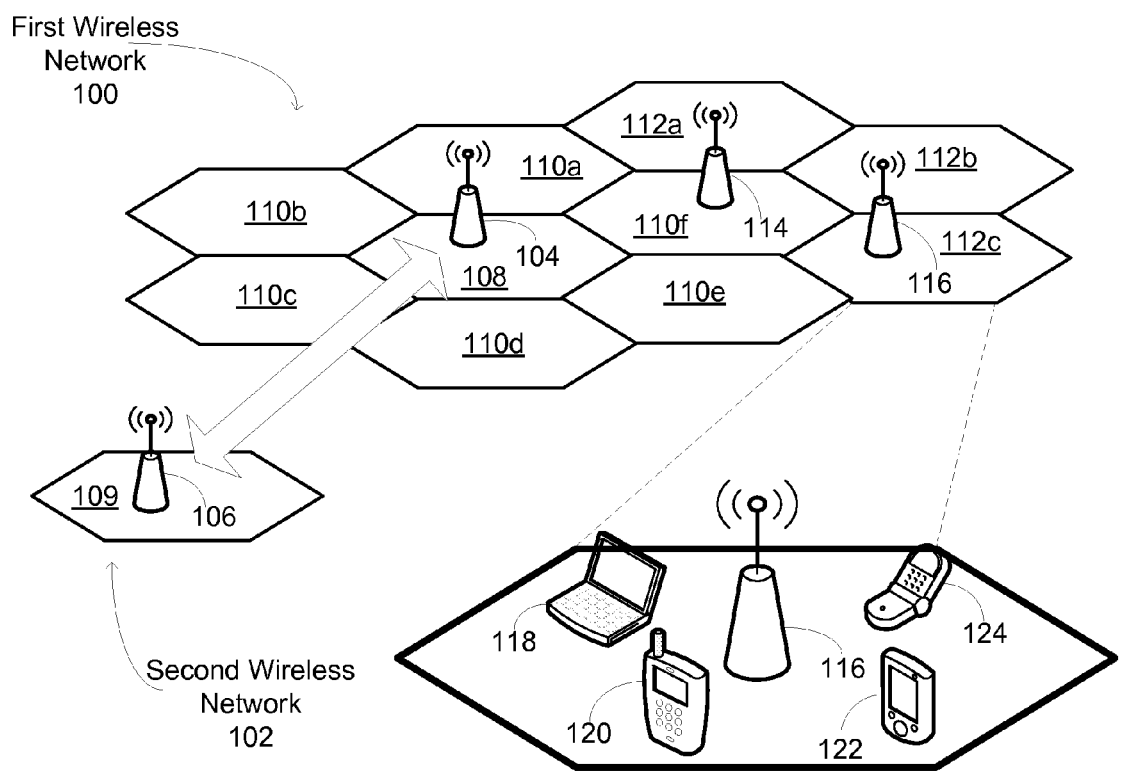
FIG. 1 is a diagram showing a first wireless network and a second wireless network which may negotiate an exchange of spectral resources, according to an example embodiment.

FIG. 1 is a diagram showing a first wireless network 100 and a second wireless network 102 which may negotiate an exchange of spectral resources, according to an example embodiment. A first wireless node 104 included in the first wireless network 100 may communicate, such as via a wireless interface, with a second wireless node 106 included in the second wireless network 102, during the negotiations. The first wireless network 100 may be divided into a number of cells 108, 110*a*, 110*b*, 110*c*, 110*d*, 110*e*, 110*f*, 112*a*, 112*b*, 112*c*. The cells may each correspond to geographical areas within the first wireless network 100. Each cell within the first wireless network 100 may include a wireless node 104, 114, 116 which serves user terminals (described below) within the cell.

The wireless nodes 104, 114, 116 may serve the user terminals by exchanging data with the user terminals via an air interface. While FIG. 1 shows a wireless node only in each of cells 108, 110*f*, and 112*c*, a wireless node may be included in each of the cells in the first wireless network 100, according to an example embodiment. One or more of the wireless nodes 104, 114, 116 may, in addition to or instead of serving user terminals, negotiate exchanges, lending, or borrowing of spectral resources with another wireless network, such as the second wireless network 102. The wireless nodes 104, 114, 116 may include, for example, base stations, node Bs, gateways, relay stations, or access points.

The wireless nodes in the first wireless network 100 may serve user terminals 118, 120, 122, 124 within the network. The user terminals 118, 120, 122, 124 may include, for example, laptop or notebook computers, smartphones, personal digital assistants (PDAs), cellular telephones, WLAN (wireless local area network) devices, or WiMAX (wireless metropolitan area network) devices. The user terminals 118, 120, 122, 124 may typically communicate wirelessly with the wireless node which is located in the same cell as the user terminal 118, 120, 122, 124. However, the user terminals 118, 120, 122, 124 may at times communicate with a wireless node located in a neighboring cell.

The second wireless network 102 may also be divided into a number of cells, which may each include a wireless node such as the second wireless node 106, which is shown in cell 109. The wireless nodes included in the second wireless network 102, which may include, for example, base stations, node Bs, gateways, relay stations, or access points, may serve user terminals within the second wireless network 102, such as, for example, laptop or notebook computers, smartphones, PDAs, cellular telephones, WLAN devices, or WiMAX devices.

The first wireless network 100 and second wireless network 102 may occupy and/or serve overlapping geographical areas. To avoid interference between the wireless networks 100, 102, each wireless network 100, 102 may be allocated distinct spectral resources. The spectral resources may be allocated to the wireless networks 100, 102 by regulation, by auction, or by agreement between operators of the wireless networks 100, 102, according to example embodiments. Spectral resources may be measured or represented in units of bandwidth (e.g., Hz), time slots (or time), or other units, and may also take into consideration the frequency of the bands, a level of fragmentation, location of the wireless nodes and/or user terminals, and/or proximity (whether in frequency, time, or location) to potentially interfering wireless nodes and/or user terminals.

The load on the wireless networks 100, 102 created by exchanging data with the user terminals may vary in time and/or location. For example, the first wireless network 100 may at one time have spectral resource needs, e.g., caused by the load on the first wireless network 100, that exceed the spectral resources currently available to the first wireless network 100, and may at another time have available spectral resources which exceed the spectral resource needs for the first wireless network 100. The second wireless network 102, or other wireless networks (not shown), may also have varying spectral resource needs. Accordingly, it may be desirable for the wireless networks 100, 102 to share, exchange, lend, or borrow spectral resources to accommodate varying spectral resource needs, and to allow a more efficient use of the available spectral resources.

The spectral resource needs may be current or projected. Current spectral resource needs may reflect current load or demand on the network; for example, user terminals within the first wireless network 100 may be requesting transfer of data with the user terminals 108, 114, 116 which exceed the currently available spectral resources. Projected spectral resource needs may be based on past network loads, such as based on network loads during certain days of the week or certain hours of the day, or based on a number of subscribers within a geographical area served by the first wireless network 100.

Spectral resources may be assigned or exchanged according to long term schemes or short term schemes. Long term schemes may negotiate spectral resources over a longer time scale, and/or may negotiate or assign the spectral resources within multiple network operators. Long term schemes may take into account load prediction or estimates of network load, vertical sharing (information about spectrum availability based on priorities between technologies), a spectrum register with information on exclusion zones or spectrum sharing functions, and/or a spectrum manager that oversees spectrum usage (such as the Spectrum Manager as defined by the IST-WINNER project).

Short term schemes may negotiate smaller amounts of spectral resources, and/or, for example, may negotiate or assign the spectral resources at the cell level. Short term schemes may incur lower signaling and/or processing overhead than long term schemes, according to an example embodiment. Short term schemes may take into account the long term scheme, vertical sharing, horizontal sharing or information about spectrum availability with no priority between technologies, the spectrum register, and/or a constraint processor. The constraint processor may provide information about the technical feasibility of borrowing or lending spectral resources or resource units, such as information from the physical layer on the usability of chunks of spectral resources or predefined spectral chunk patterns, or information about radio channel conditions or average attainable spectral efficiency.

The second wireless network 102 may, for example, request to borrow spectral resources from the first wireless network 100 by sending a request to borrow spectral resources from the second wireless node 106 to the first wireless node 104. The request may include an amount of spectral resources, such as frequency bandwidth and/or time, or may include a specific bandwidth and/or time slots which the second wireless network 102 requests to borrow from the first wireless network 100. The request may also include, for example, an offer of payment in exchange for borrowing the spectral resources. The offer of payment may include an offer to pay money, such as by the owner or operator of the second wireless network 102 to the owner or operator of the first wireless network 100, or may be an offer of credit, which the first wireless network 100 may later use to borrow spectral resources from the second wireless network 102.

Upon receiving the request to borrow spectral resources, the first wireless node 104 may determine a cost of granting the request. The first wireless node 104 may determine the cost by performing calculations itself, or by forwarding the request and receiving a response from a location database associated with the first wireless network 100, such as a mobile switching center or spectrum manager (not shown). The mobile switching center or spectrum manager may, for example, store locations and/or spectral resource use of wireless nodes and/or user terminals within the first wireless network 100. In an example embodiment, the first wireless node 104 may receive a list of neighboring nodes from a location database such as a spectrum manager or mobile switching center. The list may include a location and spectral allocation for one or more user terminals in the lending cell and the neighboring cells. In this example, the determining the cost may include determining the cost of granting the request based at least in part on determining which of the one or more user terminals will not be served based at least in part on the request to borrow spectral resources and the location and spectral allocation of each of the one or more user terminals.

The cost may be based, for example, on a cost to a lending cell within the first wireless network 100 from which the spectral resources will be borrowed, as well as a cost to neighboring cells of the lending cell. The cost may thereby be based on an impact to the first wireless node's 104 cell, as well as "first tier" and "second tier" (and even tiers beyond the first and second tier) neighbor cells.

In the example shown in FIG. 1, the first wireless node's 104 cell 108 has six first tier neighbor cells 110a, 110b, 110c, 110d, 110e, 110e, 110f, and twelve second tier neighbor cells, of which three cells 112a, 112b, 112c are shown. In an example embodiment, the second wireless node 106 may send a request to borrow spectral resources to the first wireless node 104. The first wireless node 104 may, for example, consider granting the request by lending spectral resources to the second wireless network 102 which are allocated to the cell 110f; in a related example, the request to borrow spectral resources may specifically request to borrow spectral resources which have been allocated to cell 110f In this example, the cell 110f may be considered the "lending cell"; the cells 112a, 112b, 112c, 110e, 108, 110a may be considered first tier neighbors of the lending cell 110f, and the cells 110b, 110c, 110d may be considered three of the twelve second tier neighbors of the lending cell 110f.

The cost of granting the request may be based on a cost to the lending cell 110f within the first wireless network 100, as well as a cost to neighboring cells 112a, 112b, 112c, 110e, 108, 110a of the lending cell 110f, according to an example embodiment. The cost may also be based on second or third tier neighbors. The cost to each cell may be based on, for example, a predicted inability to serve user terminals within the cell. If granting the request will not prevent any user terminals within a cell from being served, the cost to that cell may be considered zero.

The inability to serve the user terminals may be based on lending the spectral resources used by some of the user terminals (resulting in the loaned spectral resources no longer being available to some user terminals), or based on predicted interference by the loaned spectral resources with the spectral resources used by some of the user terminals. The predicted interference may be based on the geographic proximity of a user terminal to a node in the second wireless network 102 (such as the second wireless node 106) which will use the borrowed spectral resources, path loss factors such as shadowing effects caused by buildings, and the proximity of the bandwidths used by the borrowing node and the user terminal. A general cost function for loaning spectral resources may be as follows:

$$U(f,t) = \sum_{i=1}^{N} c_n(f,t)$$

which is a summation of the costs over the users associated with not being able to serve a user, where $c_n$ identifies the cell, N is the number of users in the cell. A more specific cost function for loaning spectral resources may be as follows:

$$U(f,t) = U_{target\ cell}(f,t) + \Sigma U_{neighbor}(f,t)$$

where f is the frequency range requested by the second wireless network 102 and t is time for which the resources are requested.

The cost may, for example, include a cost associated with not serving each user terminal which will no longer be served as a result of granting the request. The cost associated with each user terminal may be based, for example, on a priority class of the user terminal, the type of traffic used by the user terminal (such as voice or data), and/or how long the user terminal will not be served.

The cost of granting the request to loan spectral resources may be compared to the gain of granting the request, which may be a monetary payment. If the gain is greater than the cost, then the first wireless node 104 may grant the request. If the gain is less than the cost, then the first wireless node 104 may either decline the request or offer an alternative deal. The first wireless node 104 may, for example, offer to loan fewer spectral resources to reduce the cost by reducing the number and/or type of user terminals not served as a result of the deal.

Figure 2:
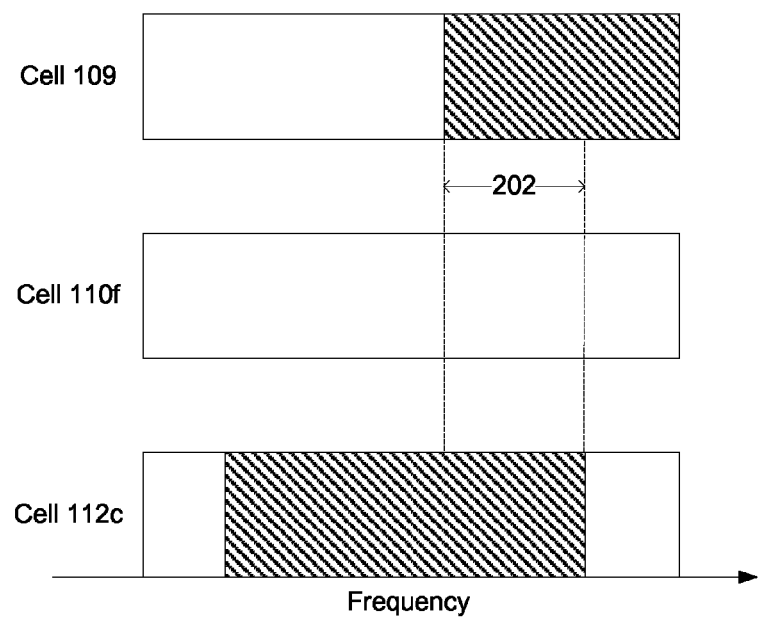
FIG. 2 is a block diagram showing desired and available spectrum for cells in the first wireless network and the second wireless network, according to an example embodiment.

FIG. 2 is a block diagram showing desired and available spectrum for cells 109, 110f, 112c in the first wireless network 100 and the second wireless network 102, according to an example embodiment. In this example, in which the second wireless node 106 may be negotiating on behalf of the second wireless network 102 with the first wireless node 104 and request to borrow spectral resources from the first wireless network 100, the shaded area of the rectangle next to the borrowing cell 109 may represent the spectrum desired by the second wireless network 102. While this example shows the spectrum desired for use by the borrowing cell 109 which includes the second wireless node 106, the second wireless node 106 may negotiate for spectrum to be used by other cells in the second wireless network 102.

In this example, the lending cell 110f may not be using any of the spectrum desired by the borrowing cell 109. Thus, the cost to the lending cell 110f may be zero. However, the spectrum desired by the borrowing cell 109 may overlap with the spectrum used by the neighboring cell 112c, as shown by the area of overlap 202 between the dashed lines. Thus, if the borrowing cell 109 borrows and uses the requested spectral resources, the second wireless node 106 and user terminals in the borrowing cell 109 may interfere with the wireless node 116 and user terminals 118, 120, 122, 124 in the neighbor cell 112c. In this example, the first wireless node 104 may determine a cost to the neighboring cell 112c based on which user terminals 118, 120, 122, 124 may not be served as a result of lending the spectral resources, as well as information about each of the user terminals 118, 120, 122, 124 which may not be served, such as their priority class, traffic type, and/or how long they will not be served.

While the cost to the lending cell 110f may be considered zero because the lending cell 110f is not using any of the desired spectrum, the use of the desired spectrum within the area of overlap 202 by both the borrowing cell 109 and the neighboring cell 112c may, in an example embodiment, prevent any possible use of the spectrum within the area of overlap by the lending cell 110f. In this example, the inability of the lending cell 110f to use any of the spectrum within the area of overlap 110f may be considered a cost to the lending cell 110f, which cost may be included in the cost function above.

Figure 3A:
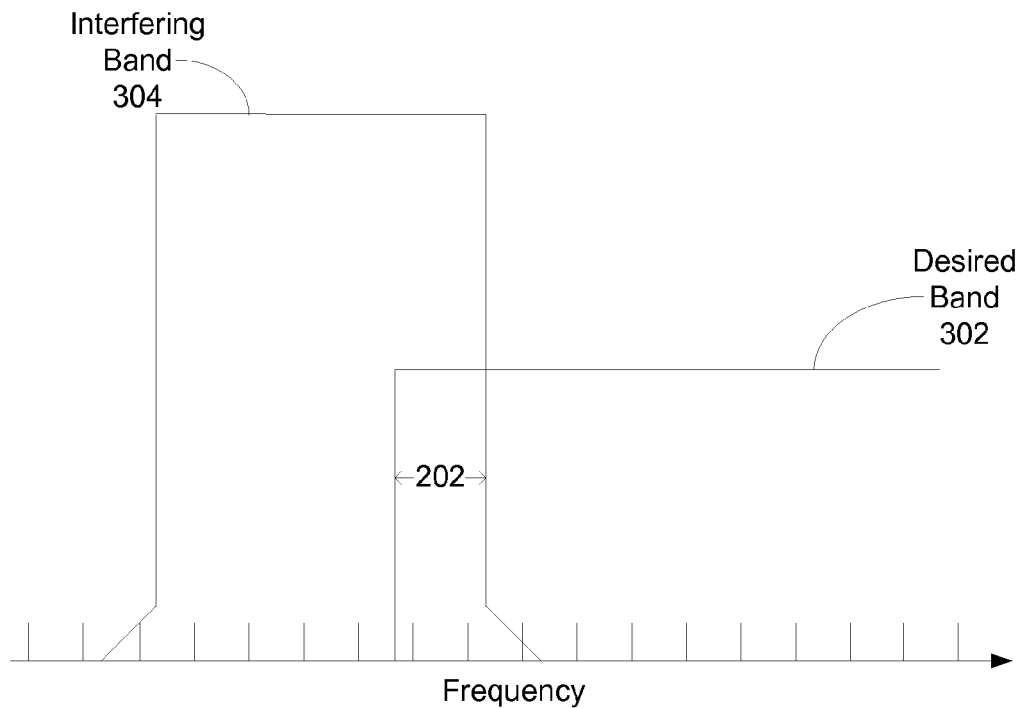
FIG. 3A is a diagram showing a desired band for the first wireless network and a spectrum mask of an interfering band which may be borrowed by the second wireless network, according to an example embodiment.

FIG. 3A is a diagram showing a desired band 302 for the first wireless network 100 and a spectrum mask of an interfering band 304 which may be borrowed by the second wireless network 102, according to an example embodiment. The desired band 302 may correspond to the spectrum used by the neighboring cell 112c, and the interfering band 304 may correspond to the spectrum used by the borrowing cell 109, for example. The short vertical lines along the frequency axis may quantize the spectrum into blocks of subcarriers.

The area of overlap 202 may represent the interference that would exist between the borrowing cell 109 and the neighboring cell 112c with vertical frequency cutoffs. However, imperfect filters may allow out-of-band emissions from the borrowing cell 109, as shown by the sloped portions of the spectrum mask of the interfering band 304. These out-of-band emissions may affect the channel quality of portions of the desired band 302 which are outside the borrowed spectrum.

Figure 3B:
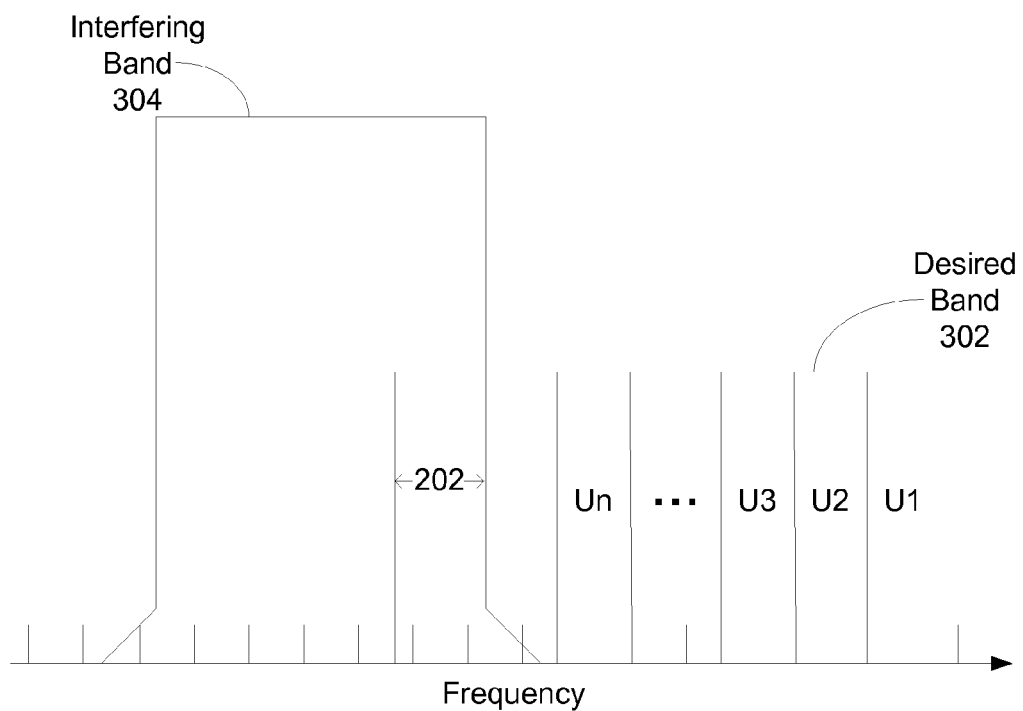
FIG. 3B is a diagram showing the desired band for the first wireless network, the spectrum mask of the interfering band, and bandwidth assignments for user terminals, according to an example embodiment.

FIG. 3B is a diagram showing the desired band 302 for the first wireless network 100, the spectrum mask of the interfering band 304, and bandwidth assignments U1, U2, U3 . . . Un for user terminals, according to an example embodiment. A scheduling algorithm may, for example, schedule the user terminals with the highest channel quality indication requirements, highest priority class, and/or highest interference from the requesting cell 109 in the part of the desired band 302 that is farthest from the interfering band. User terminals with less strict channel quality indication requirements, lower priority class, and/or lower interference from the requesting cell 109 may be scheduled closer to the interfering band 304. The user terminals may be scheduled until the first wireless node 104 predicts that the available spectrum may not be sufficient to serve the next user terminal. While FIG. 3B shows each bandwidth assignment U1, U2, U3 . . . Un with an equal bandwidth assignment, adaptive modulation schemes may assign different bandwidths to ensure a minimal threshold of channel quality and/or error rate for the user terminals which are scheduled; in an example which uses adaptive modulation schemes, the user terminals may receive unequal bandwidth assignments.

A wireless node, such as the first wireless node 104 in the first wireless network 100, may receive a request from another wireless node in another wireless network, such as the second wireless node 106, to borrow spectral resources from the first wireless network 100. The wireless node may, based on an assumption that the request will be granted, reallocate or reschedule the remaining spectral resources to the user terminals within the first wireless network 100. The remaining spectral resources may be reallocated or rescheduled within a lending cell 110f from which the spectral resources may be taken, as well as within neighboring cells 112a, 112b, 112c, 110e, 108, 110a of the lending cell 110f which may suffer from interference caused by the second wireless node 106 using the borrowed spectral resources. The reallocation or rescheduling of the spectral resources within the lending cell 110f and the neighboring cells 112a, 112b, 112c, 110e, 108, 110a may result in some user terminals no longer receiving service. The first wireless node 104 may determine a cost of granting the request based on costs associated with each of the user terminals which may no longer receive service; the user terminals which may no longer receive service may be located within or served by the wireless node within the lending cell 110f as well as the neighboring cells 112a, 112b, 112c, 110e, 108, 110a. The first wireless node 104 may determine that a gain associated with granting the request (such as an offer of monetary payment) exceeds the cost of granting the request, and send a message to the second wireless node 106 accepting the request to lend the spectral resources to the second wireless node 106 and/or the second wireless network 102 based on the determined cost and/or the gain. Or, the first wireless node 104 may determine that the cost is too high, and determine required resources which would allow the first wireless node 104 to loan some of the requested spectral resources while keeping the cost of lending the spectral resources down to an acceptable level.

Figure 4:
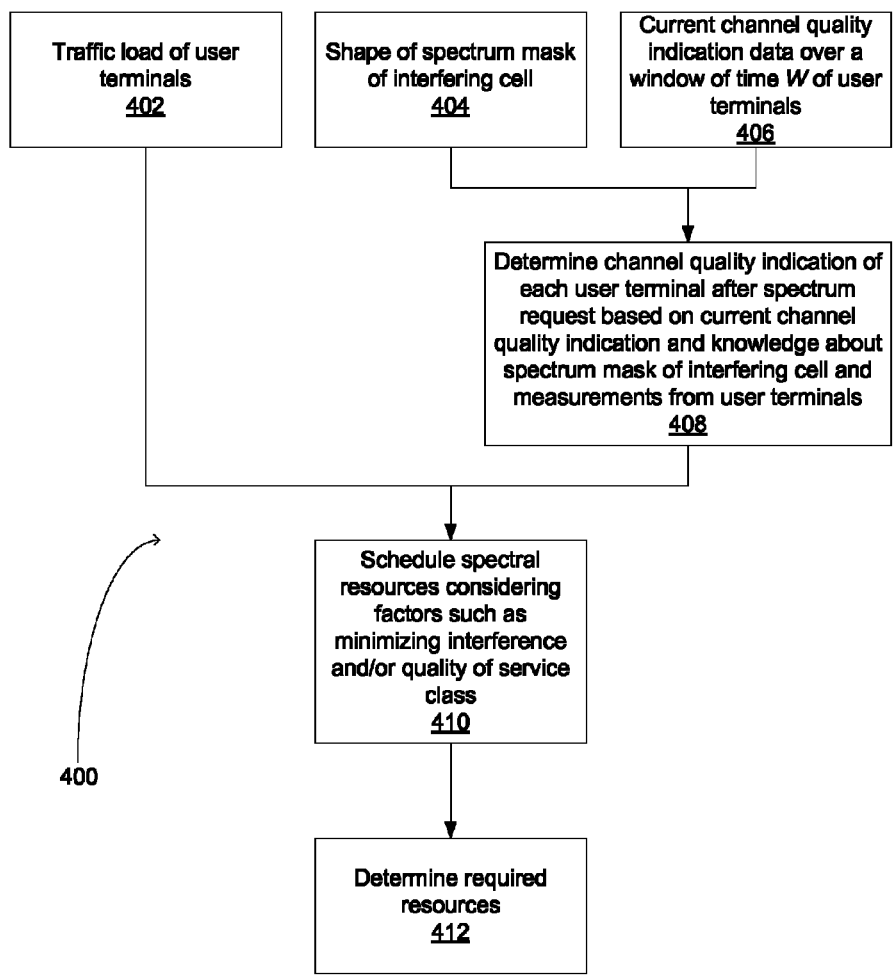
FIG. 4 is a flowchart showing an algorithm to schedule resources and determine required spectral resources according to an example embodiment.

FIG. 4 is a flowchart showing an algorithm 400 to schedule resources and determine required spectral resources according to an example embodiment. The first wireless node 104, or other node associated with the first wireless node 104, may perform the algorithm 400 in response to receiving a request to borrow spectral resources, according to an example embodiment. The algorithm 400 may include, for example, determining a traffic load of the user terminals (402). The traffic load of the user terminals may be determined, for example, based on the current data traffic between the user terminals and the wireless nodes serving the respective cells, or based on predicted traffic, which may be based, for example, on the number of user terminals in the respective cells, user types, and/or past usage patterns of the user terminals.

The algorithm 400 may also include determining a shape of the spectrum mask of the interfering/requesting/borrowing cell (404). The shape of the spectrum mask may be determined, for example, based on factors such as the requested spectrum or frequency range, the location of the requesting cell 109 and/or second wireless node 106, path loss factors such as geography or the locations of buildings or other objects, and/or the predicted signal strength of signals sent via the requested spectral resources. The shape of the spectrum mask may also be known in advance, such as for a certain radio system.

The algorithm 400 may also include determining current channel quality indication data of user terminals, such as over a window of time W (406). The channel indication data may be determined by, for example, either the user terminals or wireless nodes obtaining carrier-to-interference plus noise ratio (CINR) measurements such as physical CINR measurements, effective CINR measurements or multiple-input multiple-output (MIMO) feedback, precoding/channel matrix/ weight, signal strength, modulation and/or coding schemes, etc.

The algorithm 400 may also include determining the channel quality indication of each user terminal after the spectrum request, such as based on current channel quality indication and knowledge about the spectrum mask of the interfering cell and measurements from the user terminals (408). The channel quality indication of each user terminal after the spectrum request may be determined, for example, by introducing noise to the current channel quality indication. The noise may be calculated based on the shape of the spectrum mask of the interfering band 304, as shown in FIGS. 3A and 3B. The noise introduced to each user terminal may be based on relative geographical and/or spectral positions of the user terminals and the spectrum mask, as well as path loss factors such as shadowing effects caused by buildings or other objects. The spectral positions of the user terminals may be based on scheduling of the user terminals, which may in turn be based in part on the position and/or shape of the spectrum mask, as described below.

Based on the traffic load of the user terminals and the determined channel quality indication of the user terminals after the spectrum request, the algorithm 400 may include scheduling spectral resources considering factors such as minimizing interference, and/or quality of service class (410). For example, wireless nodes and/or user terminals which may be more strongly affected by interference from the borrowed spectral resources (due to geographical proximity or shadowing effects such as locations of buildings or other objects) may be allocated spectral resources which are further from the spectrum mask of the interfering band 304. Also, user terminals with a higher priority class may be allocated spectral resources which are further from the spectrum mask of the interfering band 304.

Figure 5:
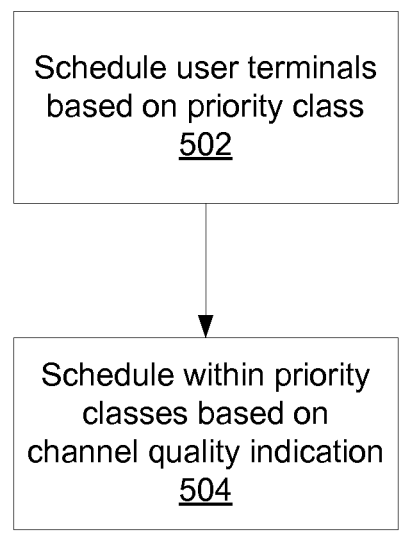
FIG. 5 is a flowchart showing an algorithm for scheduling users within remaining spectral resources according to an example embodiment.

Scheduling the spectral resources may be included in the determining the cost of granting the request to borrow spectral resources. Scheduling the user terminals within remaining spectral resources may, for example, be divided into scheduling based on priority class and scheduling based on channel quality indication. FIG. 5 is a flowchart showing an algorithm for scheduling users within remaining spectral resources according to an example embodiment. In this example, the user terminals may first be scheduled based on priority class (502). Different user terminals may be assigned priority classes based, for example, on subscription terms with an operator of the wireless network. The higher priority classes may be assigned spectrum further from the spectrum mask of the interfering band 304.

Within each priority class, user terminals may be scheduled based on channel quality indication. For example, the user terminals with the lowest channel quality indications may be scheduled furthest from the spectrum mask of the interfering band 304 in order to maximize the number of user terminals with channel quality indications after the spectral resources have been loaned to the other wireless network.

In an example embodiment, the guardband of the remaining spectrum may be reduced, and/or assigned to lower priority user terminals.

Referring again to FIG. 4, the algorithm 400 may also include determining the required resources (412). The required spectral resources may include spectral resources required to serve user terminals in the lending cell 110f and the neighboring cells 112a, 112b, 112c, 110e, 108, 110a. Determining the required spectral resources may be included in determining the cost of granting the request for spectral resources, according to an example embodiment.

After scheduling the resources, the first wireless node 104 may determine that the cost of granting the request to borrow spectral resources is too high. However, the first wireless node 104 may determine minimal required resources which may allow enough of the user terminals to be served to keep the cost of lending spectral resources down to an acceptably low level. Upon determining the required spectral resources, the first wireless node 104 may send an offer or counter-offer to the second wireless node 106 to lend any remaining spectral resources, according to an example embodiment.

Figure 6:
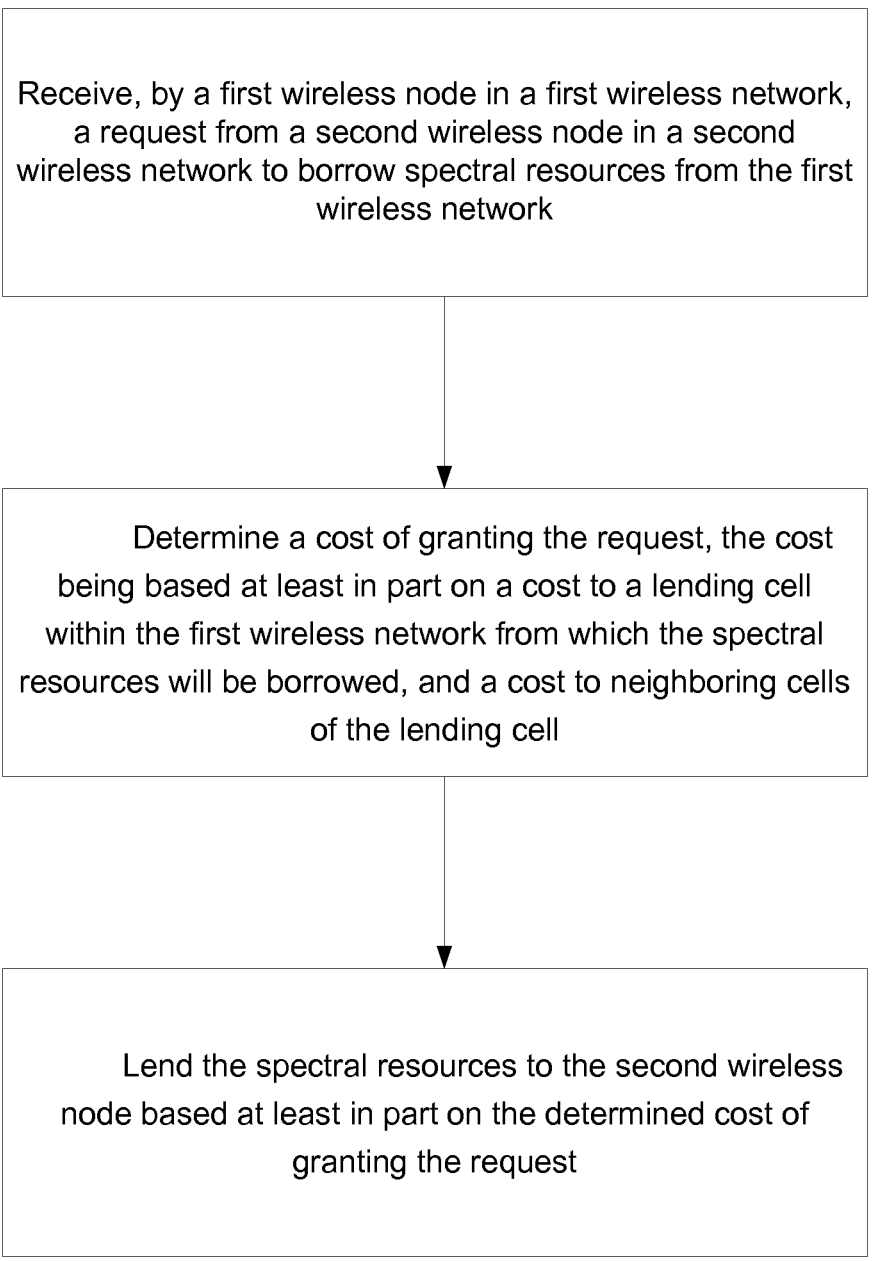
FIG. 6 is a flowchart showing a method according to an example embodiment.

FIG. 6 is a flowchart showing a method 600 according to an example embodiment. According to this example, the method 600 may include receiving, by a first wireless node in a first wireless network, a request from a second wireless node in a second wireless network to borrow spectral resources from the first wireless network (602). The method 600 may further include determining a cost of granting the request, the cost being based at least in part on a cost to a lending cell within the first wireless network from which the spectral resources will be borrowed and a cost to neighboring cells of the lending cell (604). The method 600 may further include lending the spectral resources to the second wireless node based at least in part on the determined cost of granting the request (606).

In an example embodiment, the receiving the request may include receiving the request from the second wireless node, the request including an offer of payment in exchange for borrowing the spectral resources. In this example, the lending the spectral resources may include lending the spectral resources to the second wireless node based at least in part on comparing the determined cost to the offered payment.

In another example embodiment, the method may further comprise determining whether to grant the request based on comparing the cost to a gain, the gain being based on the offered payment.

In another example embodiment, the method may further comprise determining whether to grant the request based on comparing the cost to a gain in reputation, the gain in reputation being based on the willingness to share resources. The gain in reputation may be determined using objective parameters such as willingness to share, response time, available resources for sharing and so on. The reputation may, for example, include a reputation among wireless networks or operators of wireless networks. For example, if the first wireless network 100 develops a reputation of being open to sharing, other wireless networks may provide spectral resources to the first wireless network 100 more quickly, may allow faster download speeds by the first wireless network 100, and/or may be more willing to request to borrow spectral resources from the first wireless network 100.

In another example embodiment, the method may further comprise determining whether to grant the request based on comparing the cost to a gain, the gain being based on or including improving the system performance (and thus increasing the ability to serve users). The improved system performance may, for example, be based on improving the system performance of the first wireless network 100 and/or the second wireless network 102. The improvement to the system performance may be considered in the gain or offer of payment, or may be a separate consideration by the first wireless network 100 or first wireless node 104.

In another example, the determining the cost may include determining spectral resources required to serve user terminals in the lending cell and the neighboring cells.

In another example, the determining the cost may include scheduling resources for user terminals in the lending cell and the neighboring cells based on minimizing interference between the user terminals and the borrowed spectral resources, the scheduling being based on an assumption that the request was granted.

In another example, the determining the cost may include scheduling resources for user terminals in the lending cell and the neighboring cells based on priority class of the user terminals, the scheduling being based on an assumption that the request was granted.

In another example, the determining the cost may include scheduling resources for user terminals in the lending cell and the neighboring cells based on priority class of the user terminals and, within each priority class, scheduling resources based on channel quality indications, the scheduling being based on an assumption that the request was granted.

In another example, the determining the cost may include scheduling resources for user terminals in the lending cell and the neighboring cells based on quality of service class of the user terminals, the scheduling being based on an assumption that the request was granted.

In another example, the determining the cost may include determining a cost associated with not serving one or more user terminals within the lending cell and neighboring cells as a result of granting the request.

In another example, the method may further include receiving a list of neighboring wireless nodes from a location database, the list including a location and spectral allocation for one or more user terminals in the lending cell and the neighboring cells. In this example, the determining the cost may include determining the cost of granting the request based at least in part on determining which of the one or more user terminals will not be served based at least in part on the request to borrow spectral resources and the location and spectral allocation of each of the one or more user terminals.

In another example, the determining the cost may include determining the cost based at least in part on a priority class of user terminals which will not be served if the request is granted.

In another example, the determining the cost may include determining the cost based at least in part on a traffic type of user terminals which will not be served if the request is granted.

In another example, the determining the cost may include predicting a spectrum mask of a cell of the second wireless node if the request is granted, determining a current channel quality indication (CQI) of one or more user terminals in the lending cell and the neighboring cells, and predicting a new CQI of the one or more user terminals in the lending cell and the neighboring cells if the request is granted.

In another example, the determining the cost may include considering additional interference caused to neighboring cells if the resources are released or loaned.

Figure 7:
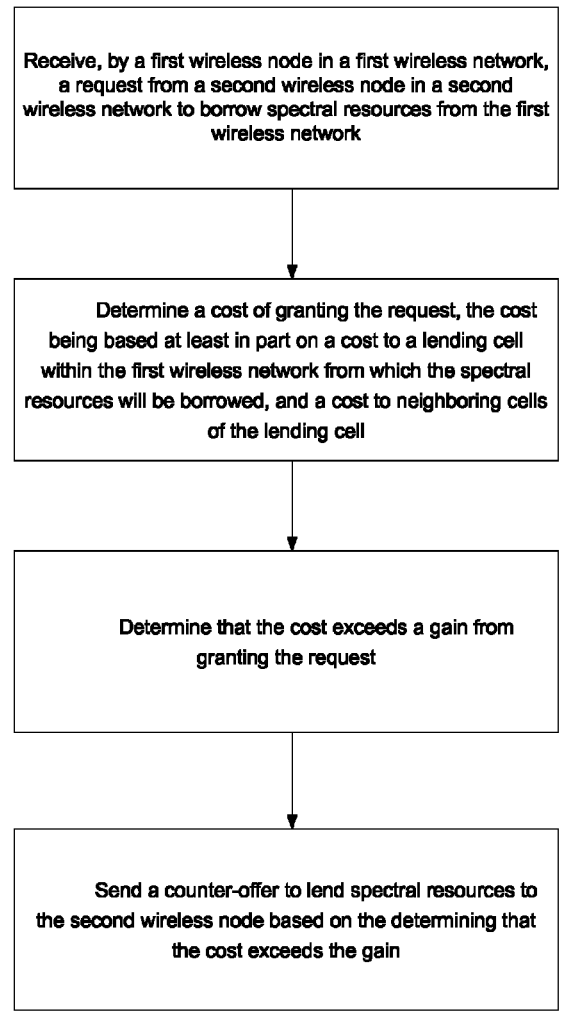
FIG. 7 is a flowchart showing a method according to another example embodiment.

FIG. 7 is a flowchart showing a method 700 according to another example embodiment. In this example, the method 700 may include receiving, by a first wireless node in a first wireless network, a request from a second wireless node in a second wireless network to borrow spectral resources from the first wireless network (702). The method 700 may further include determining a cost of granting the request, the cost being based at least in part on a cost to a lending cell within the first wireless network from which the spectral resources will be borrowed and a cost to neighboring cells of the lending cell (704). The method 700 may further include determining that the cost exceeds a gain from granting the request (706). The method 700 may further include sending a counter-offer to lend spectral resources to the second wireless node based on the determining that the cost exceeds the gain (708).

Figure 8:
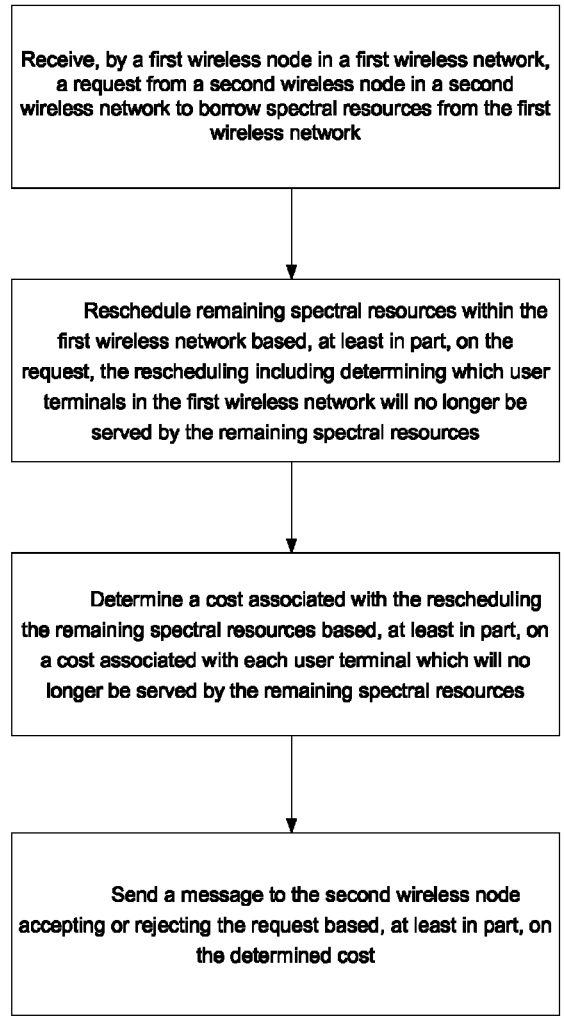
FIG. 8 is a flowchart showing a method according to another example embodiment.

FIG. 8 is a flowchart showing a method 800 according to another example embodiment. In this example, the method 800 may include receiving, by a first wireless node in a first wireless network, a request from a second wireless node in a second wireless network to borrow spectral resources from the first wireless network (802). The method 800 may further include rescheduling remaining spectral resources within the first wireless network based, at least in part, on the request, the rescheduling including determining which user terminals in the first wireless network will no longer be served by the remaining spectral resources (804). The method 800 may further include determining a cost associated with the rescheduling the remaining spectral resources based, at least in part, on a cost associated with each user terminal which will no longer be served by the remaining spectral resources (806). The method 800 may further include sending a message to the second wireless node accepting or rejecting the request based, at least in part, on the determined cost (808).

In an example embodiment, the rescheduling the remaining spectral resources may include rescheduling the remaining spectral resources within the first wireless network based, at least in part, on the request, the rescheduling including determining which user terminals in the first wireless network will no longer be served by the remaining spectral resources, the determining which user terminals in the first wireless network will no longer be served including determining effects of interference from the borrowed spectral resources on the user terminals.

In another example, the rescheduling the remaining spectral resources may include rescheduling the remaining spectral resources within the first wireless network based, at least in part, on the request, the rescheduling including determining which user terminals in the first wireless network will no longer be served by the remaining spectral resources, the determining which user terminals in the first wireless network will no longer be served including determining path loss effects on the user terminals from the borrowed spectral resources.

In another example, the rescheduling the remaining spectral resources may include rescheduling the remaining spectral resources within the first wireless network based, at least in part, on the request, the rescheduling including determining which user terminals in the first wireless network will no longer be served by the remaining spectral resources, the determining which user terminals in the first wireless network will no longer be served including determining interference on the user terminals based on a spectrum mask of the borrowed spectral resources.

In another example, the rescheduling the remaining spectral resources may include rescheduling the remaining spectral resources within the first wireless network based, at least in part, on the request, the rescheduling including determining which user terminals in the first wireless network will no longer be served by the remaining spectral resources, the determining which user terminals in the first wireless network will no longer be served including predicting traffic load of the user terminals.

In another example, the rescheduling the remaining spectral resources may include rescheduling the remaining spectral resources within the first wireless network based, at least in part, on the request, the rescheduling including determining which user terminals in the first wireless network will no longer be served by the remaining spectral resources, the determining which user terminals in the first wireless network will no longer be served including estimating channel quality indications of each of the user terminals.

In another example, the rescheduling the remaining spectral resources may include rescheduling the remaining spectral resources within the first wireless network based, at least in part, on the request, the rescheduling including assigning, to user terminals which will be more affected by the borrowed spectral resources due to geographical features, spectral resources further from the borrowed spectral resources.

In another example, the rescheduling the remaining spectral resources may include rescheduling the remaining spectral resources within the first wireless network based, at least in part, on the request, the rescheduling including assigning guard band spectral resources to lower priority user terminals.

In another example, the determining the cost associated with the rescheduling the remaining spectral resources may include determining the cost associated with the rescheduling the remaining spectral resources based, at least in part, on the cost associated with each user terminal which will no longer be served by the remaining spectral resources, the cost associated with each user terminal being based, at least in part, on a priority class of the user terminal.

Figure 9:
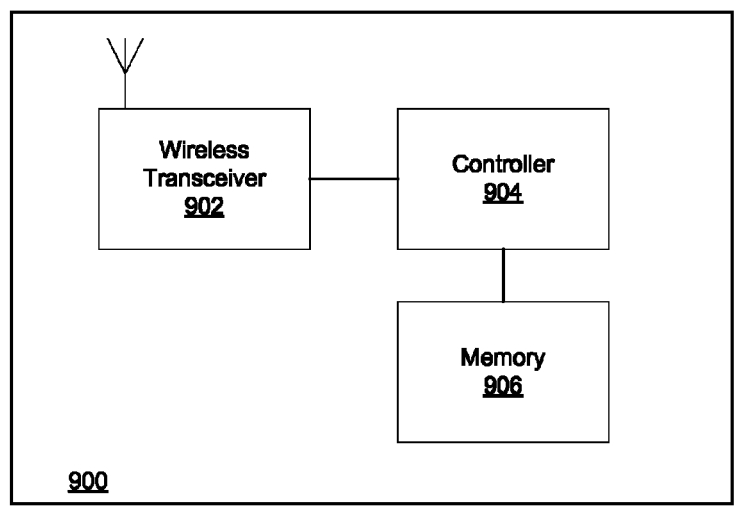
FIG. 9 is a block diagram showing an apparatus according to an example embodiment.

FIG. 9 is a block diagram showing an apparatus 900 according to an example embodiment The apparatus (e.g. wireless node 104, 106) may include, for example, a wireless transceiver 902 to transmit and receive signals, a controller 904 to control operation of the station and execute instructions or software, and a memory 906 to store data and/or instructions.

Controller 904 may be programmable and capable of executing software or other instructions stored in memory or on other computer media to perform the various tasks and functions described above, such as one or more the tasks or methods described above.

In addition, a storage medium may be provided that includes stored instructions, when executed by a controller or processor that may result in the controller 904, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. An apparatus comprising: a controller; the apparatus being configured to:
   receive, by a first wireless node in a first wireless network, a request from a second wireless node in a second wireless network to borrow spectral resources from the first wireless network;
   determine a cost of granting the request, the cost being based at least in part on:
   a cost to a lending cell within the first wireless network from which the spectral resources will be borrowed; and
   a cost to neighboring cells of the lending cell; and
   lend the spectral resources to the second wireless node based at least in part on comparing the determined cost of granting the request to a gain, the gain being based on an offered payment,
   wherein the determined cost depends at least on a current or predicted load of the lending cell and of the neighboring cells of the lending cell.

2. The apparatus of claim 1 further comprising determining whether to grant the request is based on comparing the cost to a gain, the gain being based on at least one of an increase in reputation and improved network performance.

3. The apparatus of claim 1 wherein the determining the cost includes determining spectral resources required to serve user terminals in the lending cell and the neighboring cells.

4. The apparatus of claim 1 wherein the determining the cost includes at least one of:
   scheduling resources for user terminals in the lending cell and the neighboring cells based on minimizing interference between the user terminals and the borrowed spectral resources, the scheduling being based on an assumption that the request was granted;
scheduling resources for user terminals in the lending cell and the neighboring cells based on priority class of the user terminals, the scheduling being based on an assumption that the request was granted; and
scheduling resources for user terminals in the lending cell and the neighboring cells based on priority class of the user terminals and, within each priority class, scheduling resources based on channel quality indications, the scheduling being based on an assumption that the request was granted.

5. The apparatus of claim 1 wherein the determining the cost includes scheduling resources for user terminals in the lending cell and the neighboring cells based on quality of service class of the user terminals, the scheduling being based on an assumption that the request was granted.

6. The apparatus of claim 1 wherein determining the cost includes determining a cost associated with not serving one or more user terminals within the lending cell and neighboring cells as a result of granting the request.

7. The apparatus of claim 1 further comprising:
receiving a list of neighboring wireless nodes from a location database, the list including a location and spectral allocation for one or more user terminals in the lending cell and the neighboring cells,
wherein the determining the cost includes determining the cost of granting the request based at least in part on determining which of the one or more user terminals will not be served based at least in part on the request to borrow spectral resources and the location and spectral allocation of each of the one or more user terminals.

8. The apparatus of claim 1 wherein the determining the cost includes determining the cost based at least in part on a priority class of user terminals which will not be served if the request is granted.

9. The apparatus of claim 1 wherein the determining the cost includes determining the cost based at least in part on a traffic type of user terminals which will not be served if the request is granted.

10. The apparatus of claim 1 wherein the determining the cost includes:
predicting a spectrum mask of a cell of the second wireless node if the request is granted; determining a current channel quality indication (CQI) of one or more user terminals in the lending cell and the neighboring cells; and
predicting a new CQI of the one or more user terminals in the lending cell and the neighboring cells if the request is granted.

11. A method comprising:
receiving, by a first wireless node in a first wireless network, a request from a second wireless node in a second wireless network to borrow spectral resources from the first wireless network;
determining a cost of granting the request, the cost being based at least in part on:
a cost to a lending cell within the first wireless network from which the spectral resources will be borrowed; and
a cost to neighboring cells of the lending cell;
determining that the cost exceeds a gain from granting the request; and
sending a counter-offer to lend spectral resources to the second wireless node based on the determining that the cost exceeds the gain,
wherein the determined cost depends at least on a current or predicted load of the lending cell and of the neighboring cells of the lending cell.

12. A method comprising:
receiving, by a first wireless node in a first wireless network, a request from a second wireless node in a second wireless network to borrow spectral resources from the first wireless network;
rescheduling remaining spectral resources within the first wireless network based, at least in part, on the request, the rescheduling including determining which user terminals in the first wireless network will no longer be served by the remaining spectral resources;
determining a cost associated with the rescheduling the remaining spectral resources based, at least in part, on a cost associated with each user terminal which will no longer be served by the remaining spectral resources; and
sending a message to the second wireless node accepting or rejecting the request based, at least in part, on the determined cost,
wherein the determined cost depends at least on a current or predicted load of the lending cell and of the neighboring cells of the lending cell.

13. The method of claim 12 wherein the rescheduling the remaining spectral resources includes rescheduling the remaining spectral resources within the first wireless network based, at least in part, on the request, the rescheduling including determining which user terminals in the first wireless network will no longer be served by the remaining spectral resources, the determining which user terminals in the first wireless network will no longer be served including determining effects of interference from the borrowed spectral resources on the user terminals.

14. The method of claim 12 wherein the rescheduling the remaining spectral resources includes rescheduling the remaining spectral resources within the first wireless network based, at least in part, on the request, the rescheduling including determining which user terminals in the first wireless network will no longer be served by the remaining spectral resources, the determining which user terminals in the first wireless network will no longer be served including determining path loss effects on the user terminals from the borrowed spectral resources.

15. The method of claim 12 wherein the rescheduling the remaining spectral resources includes rescheduling the remaining spectral resources within the first wireless network based, at least in part, on the request, the rescheduling including determining which user terminals in the first wireless network will no longer be served by the remaining spectral resources, the determining which user terminals in the first wireless network will no longer be served including determining interference on the user terminals based on a spectrum mask of the borrowed spectral resources.

16. The method of claim 12 wherein the rescheduling the remaining spectral resources includes rescheduling the remaining spectral resources within the first wireless network based, at least in part, on the request, the rescheduling including determining which user terminals in the first wireless network will no longer be served by the remaining spectral resources, the determining which user terminals in the first wireless network will no longer be served including predicting traffic load of the user terminals.

17. The method of claim 12 wherein the rescheduling the remaining spectral resources includes rescheduling the remaining spectral resources within the first wireless network based, at least in part, on the request, the rescheduling including determining which user terminals in the first wireless network will no longer be served by the remaining spectral resources, the determining which user terminals in the first wireless network will no longer be served including estimating channel quality indications of each of the user terminals.

18. The method of claim 12 wherein the rescheduling the remaining spectral resources includes rescheduling the remaining spectral resources within the first wireless network based, at least in part, on the request, the rescheduling including, assigning guard band spectral resources to lower priority user terminals or assigning to user terminals which will be more affected by the borrowed spectral resources due to geographical features, spectral resources further from the borrowed spectral resources.

19. The method of claim 12 wherein the determining the cost associated with the rescheduling the remaining spectral resources includes determining the cost associated with the rescheduling the remaining spectral resources based, at least in part, on the cost associated with each user terminal which will no longer be served by the remaining spectral resources, the cost associated with each user terminal being based, at least in part, on a priority class of the user terminal.

20. An apparatus, comprising:
at least one processor; and
at least one memory including computer program code the at least one memory and the computer program code configured to, with the at least one processor, cause the apparatus to perform at least the following:
receive, by a first wireless node in a first wireless network, a request from a second wireless node in a second wireless network to borrow spectral resources from the first wireless network;
reschedule remaining spectral resources within the first wireless network based, at least in part, on the request, the rescheduling including determining which user terminals in the first wireless network will no longer be served by the remaining spectral resources;
determine a cost associated with the rescheduling the remaining spectral resources based, at least in part, on a cost associated with each user terminal which will no longer be served by the remaining spectral resources; and
send a message to the second wireless node accepting or rejecting the request based, at least in part, on the determined cost,
wherein the determined cost depends at least on a current or predicted load of the lending cell and of the neighboring cells of the lending cell.

* * * * *